April 17, 1956   R. D. BECK   2,742,390
METHOD FOR BONDING PLASTIC MATERIALS
Filed May 28, 1954

INVENTOR
Ronald D. Beck
BY
J. E. Ross
ATTORNEY

United States Patent Office 2,742,390
Patented Apr. 17, 1956

2,742,390

METHOD FOR BONDING PLASTIC MATERIALS

Ronald D. Beck, Clawson, Mich., assignor to General Motors Corporation, Detroit, Mich., a corporation of Delaware Application May 28, 1954, Serial No. 433,215

6 Claims. (Cl. 154—126)

This invention relates to a method for bonding or joining and has particular utility in the manufacture of reinforced plastic vehicle bodies, boat hulls, furniture and the like. The manufacture of such structures often requires the joining or bonding of various metal or plastic fixtures, attachments, and the like to a surface of a plastic panel. Such joints may be formed by providing a layer of catalysed low-temperature curing thermosetting polymer between the surfaces of the panel and the part to be joined and then allowing the resin to cure. However, unless additional heat above that of room temperature is applied, the curing time for such thermosetting resin materials is quite long and greatly increases the time and therefore the cost of production. The nature and/or the location of the joints often make it impractical or inconvenient to use conventional heating apparatus to shorten the curing time. Heating lamps, ovens, and the like, for example, do not put the heat where it is needed, namely between the surfaces being joined and in the layer of bonding resin. Also, in the manufacture of many types of panels for plastic vehicle bodies it is very difficult and time-consuming to utilize bulky heating apparatus to make the many relatively small joints required.

The present invention has as one of its objects the provision for a method for making a bond of the type described which greatly reduces the curing time thereby increasing the rate of production and lowering production costs.

Another object of the invention is the provision of a method for bonding with thermosetting material wherein heat may be applied to the bonding material by a simple and convenient step thereby shortening the curing time and increasing the production rate.

Another object is to provide an improved method for joining or securing fixtures and attachments to the panels of plastic vehicle bodies and the like.

These objects are carried out in accordance with the invention by placing between the surface of the plastic panel and that of the fixture or attachment to be joined, a layer of viscous thermosetting polymeric material having embedded therein electrical resistance means, and thereafter passing electrical current through the resistance means to generate heat thereby accelerating the curing time of the polymeric material. In the preferred embodiment, the thermosetting bonding material consists of a catalysed low-temperature curing organic polymer such, for example, as a polyester or epoxy resin of the types which are used for the manufacture of fiberglass reinforced plastic vehicle bodies and the like. The resistance means in the preferred embodiment comprises a metal resistance wire or strip having a wavey or sinusoidal shape. By the term wavey is meant any shape having return bent portions so that the resistance element covers a greater area of the surfaces being joined than would be the case if a straight element were used.

The invention is particularly suited to the joining of metal attachment clips and the like to plastic vehicle body panels. This type joint is shown by way of example but not by way of limitation in the accompanying drawings in which.

Figure 1:
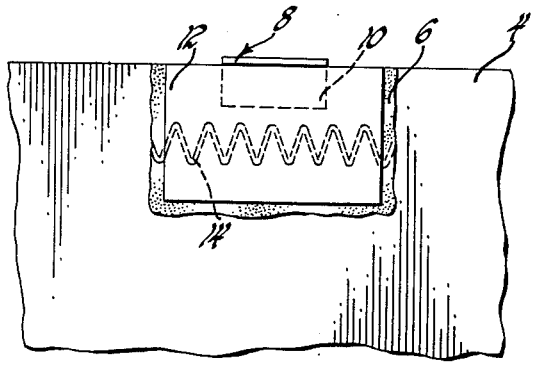
Figure 1 is a top view of a joint made in accordance with the present invention and shows the location of an electrical resistance wire in broken outline.

Referring now to the drawings, there is shown a vehicle body panel 4 which may, for example, be a portion of a trunk lid or a convertible top cover and constructed of a fiberglass reinforced polyester resin laminate. Secured to an edge portion of the panel 4 by means of bonding material 6 is an L-shaped metal attachment clip 8, one portion 10 of which is positioned between the surface of the panel 4 and that of a reinforcing block 12, the latter also being secured to panel 4 by bonding material 6. The block 12 may be made of any suitable material which forms a good bond with the resin 6, such, for example, as a hardened thermosetting resin of high strength. Between the block 12 and panel 4 and embedded in the thermosetting bonding material 6 is an electrical resistance element 14.

Figure 3:
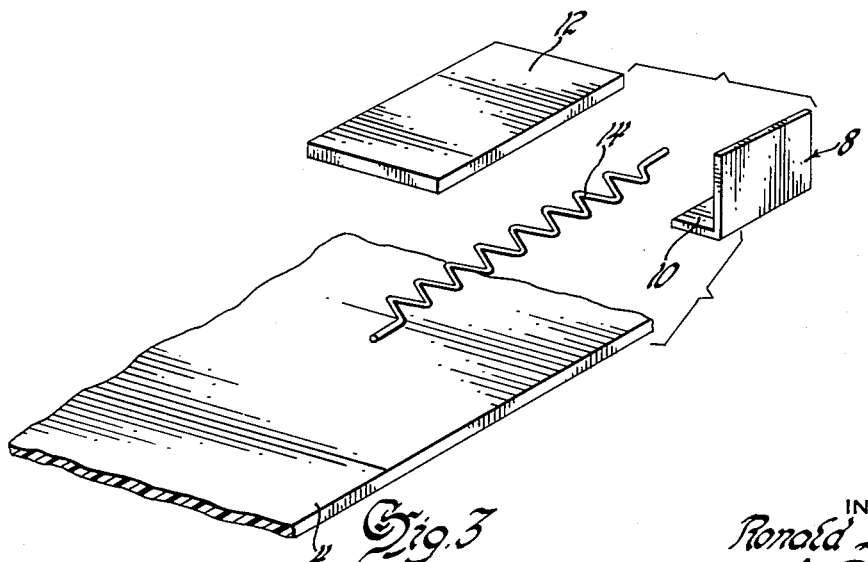
Figure 3 is an exploded view showing the various parts used in forming the joint of Figure 1.

Figure 3 shows the panel 4, clip 8, block 12 and resistance element 14 prior to assembling and forming the joint with the thermosetting bonding material.

Figure 2:
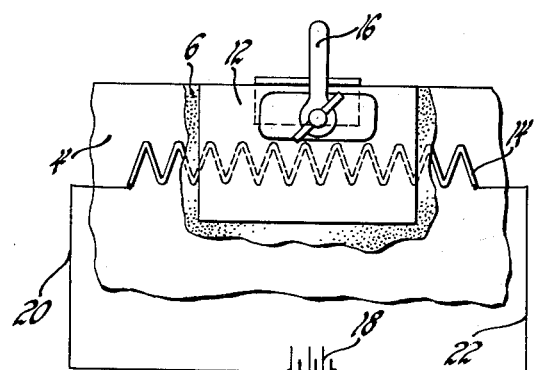
Figure 2 is a view similar to Figure 1 but diagrammatically shows the electrical circuit used in the process of the invention.

In the practice of the invention, the first step consists of assembling clip 8, block 12 and resistance element 14 to the surface of the panel 4 as shown in Figure 2, there being provided between the panel 4 and the clip and block 8 and 12 respectively, the layer of the viscous thermosetting bonding material 6.

In order to obtain a better bond it is preferable to roughen the surfaces of the panel 4 and the reinforcing block 12 prior to applying the bonding material and assembling the parts. This may be satisfactorily accomplished with any suitable abrasive or abrasion tool. In assembling the parts the usual practice is to first coat the roughened surface of panel 4 with a layer of the thermosetting resin 6, then lay the flattened end portion 10 of the clip 8 along with resistance element 14 into the resin, apply additional thermosetting resin over the tops of the end portion 10 and the resistance element 14, and then press the plastic reinforcing block 12 into the bonding material 6. A suitable jig indicated at 16 may be used to hold the resulting "sandwich-like" construction in assembled relationship until the bond is formed. With the parts thus assembled an electrical power source 18 is connected across the resistance element 14 by means of conductors 20 and 22. Electric current is then passed through the resistance element to generate heat thereby rapidly and thoroughly curing the thermosetting bonding material 6 to form the joint. The ends of the resistance element extending beyond the reinforcing block 12 may then be cut free and the jig removed. As shown in Fig. 1, the middle portion of the resistance element remains embedded in the joint without harmful effect.

As the bonding material I prefer to use a viscous or paste-like mixture of low-temperature curing thermosetting resin (together with catalysts and accelerators if needed) and glass fiber, cotton flock, asbestos fiber or the like. Sufficient fiber or cotton flock may be used to give the resin a paste or putty-like consistency. The low-temperature curing resin may, for example, be of the polyester or epoxy type together with a catalyst to reduce the required curing time. Typical epoxy resins are those resulting from the condensation of epichlorohydrin with bisophenol or glycerol. The catalyst used for the epoxy resins is usually an amine compound such as diethylenetriamine or triethylene tetramine. I have successfully used Bakelite #18795 epoxy resin with Bakelite #18793 hardener as a catalyst, each presently commercially available from the Union Carbide and Carbon Corporation. A typical polyester resin is Vibrin 151, presently commercially available from the Naugatuck Chemical Co. Peroxide type catalysts such as methyl ethyl ketone peroxide as well as an accelerator such as cobalt naphthanate are generally used with such polyester type resins. Such catalysed resins will cure at a room temperature and, when used in accordance with the practice of the present invention, will cure completely within a very short time.

The resistance wire may be of any suitable metal such, for example, as iron which has the advantage of being inexpensive. It is to be understood of course, that other metals, such as Nichrome, may be used and that the shape of the wire may take forms other than that shown in the drawings. In the particular application shown in the drawings, the wave shaped resistance wire 14 is of 21 gauge soft annealed iron and generates about 425° F when a one amp. current is applied. This heat is sufficient to completely cure the resin bonding mixture within about 3 minutes or less.

In some applications the portion of the metal clip which is positioned between the panel 4 and the block 3 may be used as the resistance element. It may be advantageous, when such is the case, to shape such portion of the clip to more uniformly distribute the heat through the bonding material. This may be accomplished, for example, by providing the clip with wave shaped legs which extend to either side of the block 12 and to the ends of which the electrical connections can be made.

It is to be understood that, although the invention has been described with specific reference to particular embodiments thereof, it is not to be so limited since changes and alterations therein may be made which are within the full intended scope of this invention as defined by the appended claims.

What is claimed is:

1. A method for joining a metal attachment clip having a flat surface to the surface of a plastic panel comprising the steps of roughening the surface of said panel, providing said surface with a layer of low temperature curing thermosetting resin, placing the flat surface of said clip and a wave-shaped electrical resistance element into said layer of resin, pressing a roughened surface of a plastic reinforcing block into said resin and then passing electrical current through said resistance element to cure said thermosetting resin and bond said clip and said block to the surface of said panel.

2. A method for joining a metal member to a plastic surface comprising the steps of sandwiching a surface of said metal member together with an electrical resistance element and a layer of thermosetting material between said plastic surface and a reinforcing member and passing an electrical current through said resistance element to cure said material and bond said reinforcing member and said metal member to said plastic surface.

3. A method as set forth in claim 2 and wherein the thermosetting material comprises a mixture of low temperature curing resin and fibrous material, said mixture having a consistency similar to that of soft putty.

4. A method for joining a metal member to a plastic surface comprising the steps of sandwiching a surface of said metal member together with a wave-shaped electrical resistance wire and a layer of low temperature curing thermosetting material between said plastic surface and a reinforcing member and passing an electrical current through said resistance element to cure said material and bond said reinforcing member and said metal member to said plastic surface.

5. A method for joining a metal attachment fixture to the surface of a fiberglass reinforced polyester resin panel comprising the steps of sandwiching a surface of said fixture, an electrical resistance element and a layer of low temperature curing thermosetting material between said panel and a plastic reinforcing block and passing an electrical current through said resistance element to cure said thermo-setting material and bond said reinforcing block and said fixture to said panel.

6. A method for joining a metal member to the surface of a plastic panel comprising the steps of roughening the surface of said panel and the surface of a plastic reinforcing block, sandwiching a surface of said metal member together with an electrical resistance element and a layer of low temperature curing thermosetting material between the roughened surface of said panel and the roughened surface of said reinforcing block and passing an electrical current through said resistance element to cure said thermosetting material and bond said reinforcing block and said metal member to said panel.

References Cited in the file of this patent

UNITED STATES PATENTS

| | | |
|---|---|---|
| 1,945,560 | Meyercord | Feb. 6, 1934 |
| 2,241,312 | Luty | May 6, 1941 |
| 2,372,929 | Blessing | Apr. 3, 1945 |
| 2,375,386 | Rick | May 8, 1945 |
| 2,647,072 | Smith | July 28, 1953 |
| 2,662,045 | Baggott | Dec. 8, 1953 |